(12) United States Patent
Wiseman (10) Patent No.: US 9,531,993 B1
(45) Date of Patent: Dec. 27, 2016

(54) DYNAMIC COMPANION ONLINE CAMPAIGN FOR TELEVISION CONTENT

(75) Inventor: Matt Wiseman, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 116 days.

(21) Appl. No.: 13/530,911

(22) Filed: Jun. 22, 2012

(51) Int. Cl.
*H04N 7/10* (2006.01)
*H04N 7/025* (2006.01)
*H04N 21/222* (2011.01)
*H04N 21/25* (2011.01)

(52) U.S. Cl.
CPC .......... *H04N 7/025* (2013.01); *H04N 21/2221* (2013.01); *H04N 21/251* (2013.01)

(58) Field of Classification Search
CPC ............ G06Q 30/0241; G06Q 30/0277; G06Q 30/0242; G06Q 30/0251; G06Q 30/0275; H04N 21/482; H04N 21/4438; H04N 7/025
USPC ........... 725/34–35, 109, 110, 32; 705/14, 37
See application file for complete search history.

(56) References Cited

U.S. PATENT DOCUMENTS

| | | | |
|---|---|---|---|
| 2005/0193016 A1* | 9/2005 | Seet | G06F 17/30758 |
| 2006/0212350 A1* | 9/2006 | Ellis | G06Q 30/0242 |
| | | | 705/14.41 |
| 2008/0275785 A1 | 11/2008 | Altberg et al. | |
| 2009/0037949 A1* | 2/2009 | Birch | 725/34 |
| 2009/0077580 A1* | 3/2009 | Konig et al. | 725/34 |
| 2009/0228914 A1 | 9/2009 | Wong et al. | |
| 2010/0023965 A1 | 1/2010 | Malik | |
| 2010/0063857 A1 | 3/2010 | Malik | |
| 2011/0213655 A1* | 9/2011 | Henkin | G06Q 30/00 |
| | | | 705/14.49 |
| 2011/0271314 A1* | 11/2011 | Hoshall | H04N 21/4438 |
| | | | 725/109 |
| 2011/0321087 A1* | 12/2011 | Huber | G06Q 30/02 |
| | | | 725/34 |
| 2011/0321107 A1* | 12/2011 | Banks | 725/110 |
| 2012/0233000 A1* | 9/2012 | Fisher | G06Q 30/02 |
| | | | 705/14.71 |

\* cited by examiner

*Primary Examiner* — Brian T Pendleton
*Assistant Examiner* — Alan Luong
(74) *Attorney, Agent, or Firm* — Lowenstein Sandler LLP (57) ABSTRACT

A method for dynamic allocation of companion online content segments includes receiving television content during a live television broadcast; creating a fingerprint of the received television content; and comparing the created fingerprint to a database of existing content segment fingerprints to determine if the created fingerprint matches any one of the existing content fingerprints. If a match occurs, the method includes increasing a bid price of a companion online content segment. Finally, if the price is sufficient, the method includes supplying the companion online content segment for display.

25 Claims, 6 Drawing Sheets

DYNAMIC COMPANION ONLINE CAMPAIGN FOR TELEVISION CONTENT

BACKGROUND

Companies currently spend billions of dollars per year on television content, to build brands, engage and educate consumers and market their products. Success in using this television content may be measured in terms of brand recall, number of new customers, sales and actions depending on the type of products and services being marketed. Increasing the return on investment on television content and its impact is important to content providers who are continuing to invest in television promotions. However, companies may not be able to efficiently present the content to viewers. One reason for this limitation may be the difficulty in identifying secondary content that can be presented to viewers in conjunction with the display of primary television content. However, even if appropriate secondary content is identified and available, communications system limitations may prevent the timely presentation of the secondary content to the viewers.

For example, primary content may be presented on a television while associated secondary content is presented on a mobile device. However, the mobile device may not be capable of synchronization with the television to allow presentation of the secondary content in time to reinforce and supplement the primary content.

DESCRIPTION OF THE DRAWINGS

The detailed description refers to the following drawings, in which like numerals refer to like items, and in which.

DETAILED DESCRIPTION

Companies and organizations currently spend over $60 billion per year in the US and over $100 billion globally to increase the engagement in, brand recall of, and impact of their live brand-related television content. By automatically detecting when a company's television content is airing and then dynamically boosting companion online content campaigns (search and display) with relevant selection criteria (e.g., by device, access method, user preferences and data, and geography), viewers who are watching brand-related content on a television and who also are using a companion device on any site/application that connects to a linked network may be shown a companion content segment. The companion content segments may include still and moving images (e.g., JPEG and MPEG) with or without audio, audio only, and broadcast or streaming images. The linked network may make the companion content segments available through locations accessible by the viewer. Examples of such locations include in a broadcast or streamed television stream, at an Internet Web site, including a Web site for a social network (e.g., at a viewer's social network page), at an application (e.g., online banking, games, geo-navigation) executing on the companion device or the television, at a radio station, and any other location at which still or moving images, and/or audio may be provided. The viewer may use the companion device, the television, or both the companion device and the television to access the companion content segments. Such companion content segments may provide a clear and engaging way to interact further with the subject of the watched television content. The companion content segment may allow a viewer to directly receive offers from a company, find out more about the company's product/service, and purchase the product/service. The use of the companion content segment allows companies to increase the impact and measurability of their television content campaign and their companion online content segment campaign while allowing viewers to benefit from promotional offers.

Figure 1:
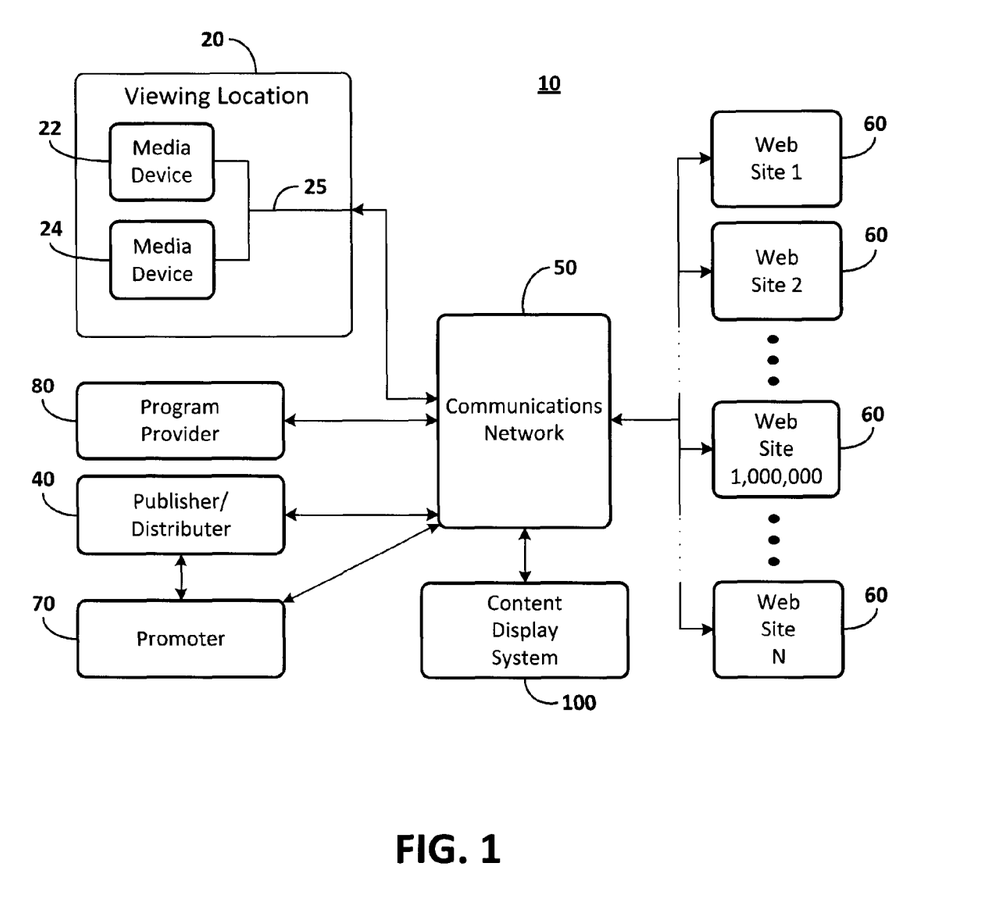
FIG. 1 illustrates an example environment that enables dynamic companion online campaigns for television promotions.

FIG. 1 illustrates an embodiment of an environment that enables dynamic companion online content segments. In FIG. 1, environment 10 includes viewing location 20 that includes media devices that communicate by way of network 50 with publisher 40 and Web sites 60. The environment 10 also includes promoters 70, program providers 80 and content display system 100.

In the environment 10 of FIG. 1, the companion online content segments are disclosed as being displayed as part of a content display system. However, the content segments also could be displayed as part of an online search system.

At the viewing location 20, individuals may view television programs and content on a television program display device (i.e., media device 22) and may communicate with the Web sites 60 using media device 24. In an alternative, media device 22 generally is fixed in position in the environment 10, and media device 24 is a mobile media device. The media devices 22 and 24 are capable of some communication, either one or two-way, using the communications network 50 and communications path 25. The communications path 25 may be wired or wireless, or both wired and wireless. In an embodiment, the media device 22 may be an Internet connected "smart" television, a "basic" or "smart" television connected to a set top box (STB), a Blu-ray player, a game box, and an Internet-connected box, or a radio, for example. In another embodiment, the media device 22 may be a television that has no Internet connectivity. A television that includes Internet connections is referred to hereinafter as an ITV. In an embodiment, the media device 24 may be a tablet, a smart phone, a laptop computer, a desk top computer, or a radio, for example. In another embodiment, the media device 24 may be a "digital picture frame" device that displays the companion online content segments. Such a digital picture frame device may allow individuals to upload pictures to the frame's memory via a USB connection, or wirelessly via Bluetooth technology. Some digital picture frame devices allow pictures to be shared from one frame to another. Certain digital picture frame devices can load pictures over the Internet from RSS feeds, photo sharing sites and from e-mail. Such networked digital picture frame devices usually support wireless (802.11) connections. Moreover, some digital picture frame devices use cellular technology to transfer and share files easily and faster. The same digital picture frame devices may be used in the system 100 to display companion online content segments. In yet another embodiment, the media devices 22 and 24 are combined into a single device such a picture-in-picture (PIP) capable television, and the companion online content segments are displayed in a PIP window of the media device while the content is displayed on a main window of the media device.

Among other functions, the media device 24 may interface with the Web sites 60 using a browser, and may be used to execute specific applications that use data and/or services at the Web sites. Examples of such applications include online banking, games, mapping services, and other applications. The applications that execute on the media device 24 may provide content segment slots in which companion online content segments may be placed. For example, an online game may refresh after every move of the game, and the refreshed page displayed on the media device 24 may include, or may be preceded by, a content segment slot that may show a companion online content segment.

When the media device 24 is turned on, an individual using the media device 24 may sign on with a service or program provider such as an Internet service provider (which, in an embodiment, may be incorporated into the content display system 100) to access the Web sites 60. In some cases, the media device 24 may sign on automatically using previously provided and stored credentials or other authentication information. The media device 24 may receive content segments that are linked, or related to the television content displayed on the media device 22, once the individual has consented to receiving such targeted content segments. The individual may signal this consent upon initial contact with the service or program provider, or may consent to such participation at each sign on. As an incentive for such participation, the service or program provider may charge the individual reduced fees. However, even when an individual has initially consented to participation in the above-described content segment delivery process, the individual at any time may opt out of such participation. The media device 24 also may send other data, such as the location, based, for example on IP address (IP ADD), of the media device 24 and/or the GPS location, to the content display system 100 (with the consent of the individual at the viewing location 20). Finally, the media device 24 may send, with consent of an individual (e.g., via opt in, opt out, or anonymization), identification (ID) information to the system 100 that identifies the media device and/or the individual at the viewing location 20. The identification information may be provided when the individual logs on to, or registers with, a service, such as a service that provides at least some of the media being displayed on the media devices 22 and 24.

Figure 2:
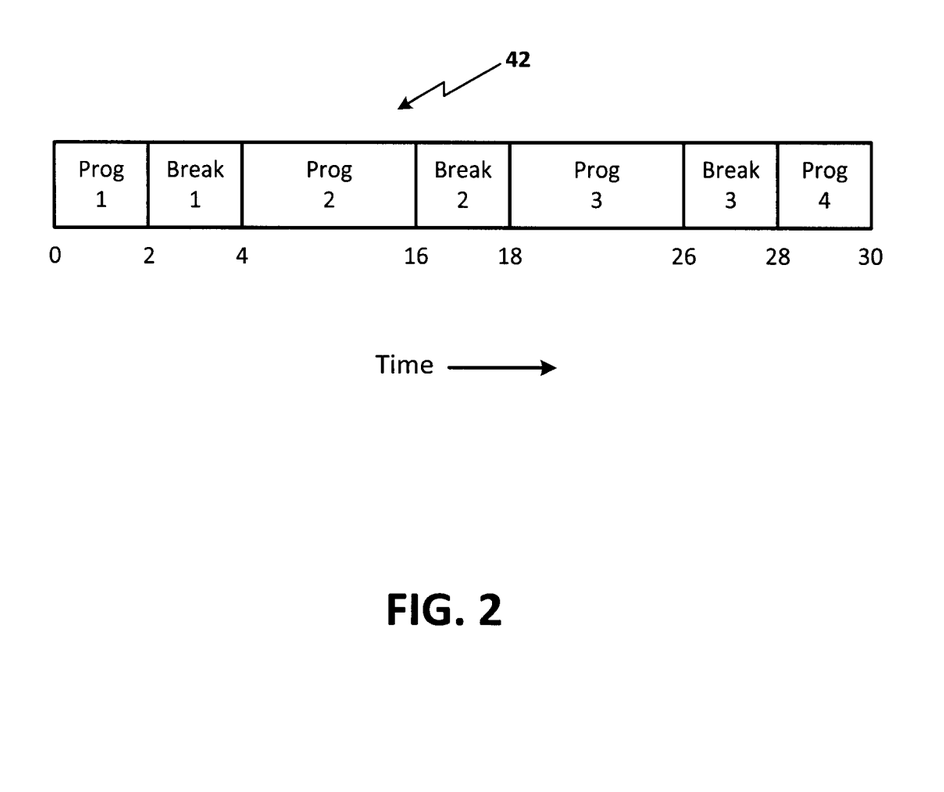
FIG. 2 illustrates a logical view of a television program with program breaks.

The publisher 40 provides television programming for transmission over the communications network 50 for display on one or more of the media devices 22 and 24. The television programming may be event driven, such as a sporting event, or may be a more constrained program, such as a dramatic show. The television programming may be structured to include one or more program breaks, as can be seen in FIG. 2. The publisher 40 may operate one or more programming networks (not shown in FIG. 1) over which the television programming is broadcast or streamed.

The network 50 may be any communications network that allows the transmission of signals, media, messages, voice, and data from the publisher 40 and the Web sites 60 to the viewing location 20, including radio, linear broadcast (over-the-air, cable, and satellite) television, on-demand channels, over-the-top media, including streaming video, movies, video clips, and games, and text, email, and still images, and transmission of signals, media, messages, voice, and data from the viewing location 20 to the content display system 100. The network 50 may include the Internet, cellular systems, and other current and future mechanisms for transmission of these and other media. The network 50 may be both wired and wireless.

The Web sites 60 provide Internet-based content for display at the media devices 22 and 24. A Web site 60 may include one or more Web pages that include locations in which content segments may be placed. The Web site 60 may interface with the content display system 100 to request a content segment to be placed in these locations. As can be seen in FIG. 1, there may be millions of Web sites 60 that interface with the content display system 100. Included in these Web sites are those for product manufacturers and service providers (i.e., the promoters 70), including Web sites for social networks. The Web sites 60 may have in place a formal agreement with the content display system 100 to request and receive content segments.

Figure 3:
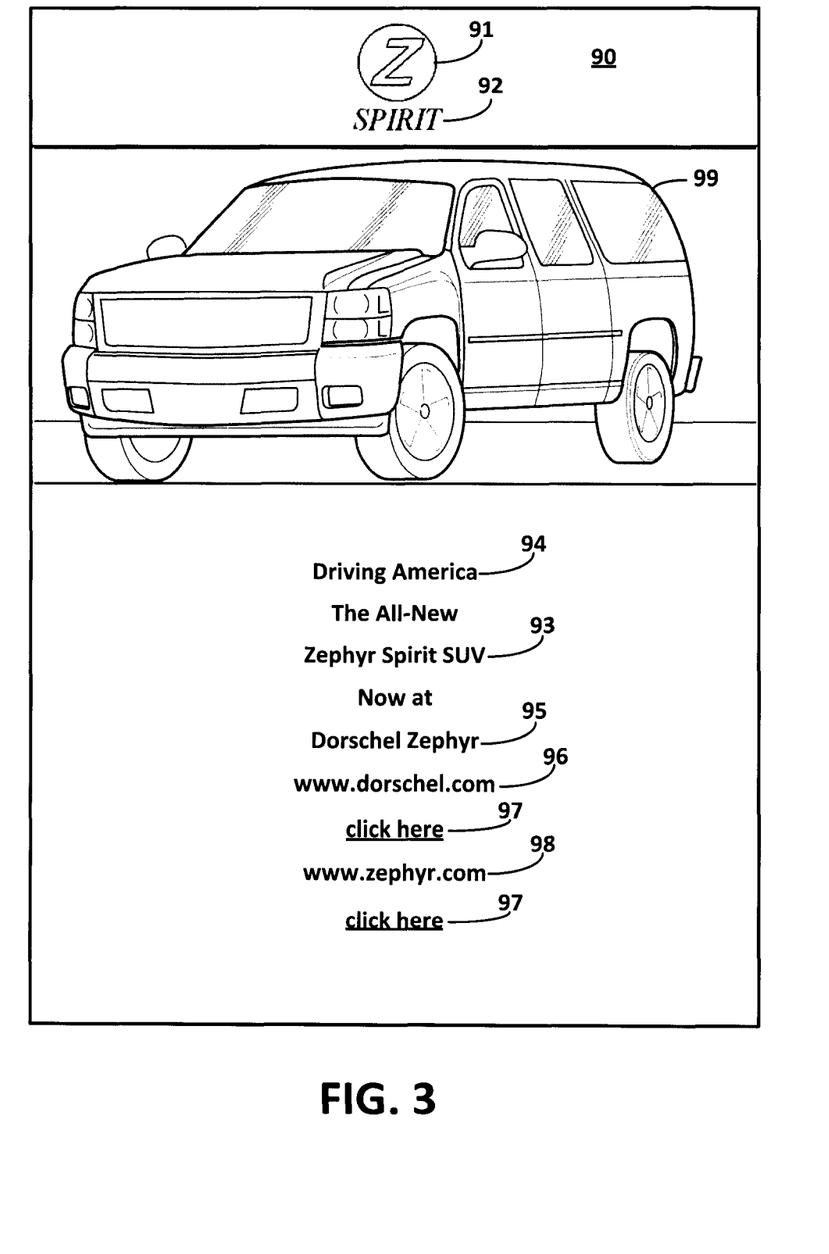
FIG. 3 illustrates an example of a content segment.

The promoter 70 generates content that may be displayed in conjunction with the display of the television programming (i.e., during the program breaks). The promoter 70 also generates, or facilitates generation of content segments that appear on the Web sites 60. In an embodiment, a promoter 70 may develop a television content campaign and a corresponding companion online content segment campaign to provide content for airing as part of a television broadcast and content segments for airing at one or more of the Web sites 60. In an alternative, the television content campaign may include both traditional content that airs during the program breaks, product placement content displays, wherein specific products are incorporated into the television programming (e.g., a specific brand of automobile is used in a television comedy show), and content displays that may be placed in fixed positions in a television program (e.g., a content display for an automobile insurance company that appears on a stadium wall during airing of a soccer game). The companion online content segment campaign may include content segments that are shown on Web pages of the Web sites 60. The content segments may be audio, text, still images, and video, or any combination thereof. The content segments may use some creative features from the corresponding television content. For example, a content segment for an automobile company may show an image of a sport utility vehicle (SUV) that was promoted during a television program. FIG. 3 is an example content segment that may be shown at one of the Web sites 60.

The promoters 70 may create multiple companion online content segments to display in conjunction with the airing of corresponding television content, and different companion online content segments may be served to different individuals. For example, television content for a Spirit SUV may have corresponding companion online content displays showing the Spirit SUV in a winter setting that touts the Spirit's all weather capabilities; another content segment that shows the Spirit SUV in an off-road setting as a fun, recreational vehicle; and another content segment that shows the Spirit SUV as a family vehicle. Which of these three corresponding companion online content segments is served may depend on specific information about the individual. For example, if the media device 24 has an IP address of upper New York state, the winter version may be served; if the media device 24 has a New Mexico IP address, the off-road version may be served. Thus, the companion online content segment campaign may incorporate specific content segment serving features.

The program providers 80 generate and provide television programming that is broadcast by the publishers 40. In an embodiment, some of the television programming is created with product placement content displays, such as a specific brand of automobile, for example.

The content display 100 provides content for display during television program breaks, content displays as product placements in a television program, or in fixed locations in a televised program, and content segments for online display at one or more of the Web sites 60. In an embodiment, the content, content segments, and content displays may be one of an advertisement, a commercial, an infomercial, or a promotion for a product or a service. One such product may be a television program to be broadcast for viewing on the television or for streaming on a media device. In another embodiment, the content, content segments, and content displays may relate to the subject matter of a program currently being displayed on a television or media device. For example, a content segment may include biographical sketches of actors performing in a broadcast television program. The content display system 100 may receive content creatives from promoters 70. Alternately, the content display system 100 may create content segments based on inputs from the promoters 70 and/or information extracted by the content display system 100 from the television content. Operation of the content display system 100 is described in detail below and with respect to FIGS. 4-6.

The content display system 100 addresses a situation in which individuals at a particular location may be exposed to media from multiple sources, and using multiple media devices, for example, watching television content on a first media device (e.g., a television) while also browsing the Internet on a second (e.g., mobile) media device, with content segments served on the mobile media device not being relevant to the watched television content. One way to improve the relevancy of content segments served on the mobile media device is to tie the content segments to observable data from the television programming including television content and product placement content displays. One such way to tie the content to the observable data is to capture and analyze the observable data, and then to base the promotional decision on the analysis. One way to capture the observable data involves a technique known as automatic content recognition. One known system for automatic content recognition involves identification of songs and music based on the collection of samples of such songs and music. In this system, a signal collection and identification system captures samples of a local audio environment containing musical recordings or other audio sources. To accomplish the audio identification, the audio samples or audio feature samples are processed in a pattern recognition system, which compares the features of the audio samples with similar feature data stored in a pattern database. A pattern initialization system accepts complete audio works that are to be entered into the pattern database. These systems create fingerprints by extraction of feature waveforms from the entire work. The feature waveforms then are broken into overlapping time-series segments and processed to determine which features should be used for signal recognition and in what order. The resulting reference pattern data structures (i.e., the fingerprints) are stored in the pattern database. These fingerprints are subsequently transferred to a pattern recognition system for comparison with unknown input audio samples. When the input audio samples are matched with fingerprints in the pattern database, the detection results are indexed with corresponding data in a management database such as the name of the song and the artist. Similar processes may be used for feature extraction and comparison of video, for video and audio combined, and for content recognition based on embedded signals (e.g., watermarks, and code, images or text embedded as subtitles, or in closed captioning).

The content display system 100 may use fingerprinting to determine what content is displayed on the television. Such fingerprinting uses, in one alternative, a reference database of audio or video clips from the television programming and content for comparison to the content clips obtained by a monitor device at the content display system 100. This automatic content recognition process involves translating (e.g., analog/digital conversion), if required, the content clips and encoding the digitized representations as fingerprints representing an audio or a video signal. Audio content recognition, for example begins by reformatting (digitizing) the audio input, framing the digitized signal, extracting features, and creating signatures from the extracted features. The thus-created signatures constitute the audio fingerprint. Fingerprinting algorithms then can identify content in real time or near real time.

Thus, the content display system 100 may use fingerprint extraction and analysis techniques to identify content displayed on the media device 22. Such fingerprinting may occur upon detection of the content or an impending program break. For example, some broadcast television programming includes an embedded code to signify an impending program break, and the content display system 100 may use this code to initiate the fingerprint recording process. Alternately, the content display system 100 may process and generate content fingerprints from the recordings on a continuous or near-continuous basis. By fingerprinting continuously, the content display system 100 may not need to detect content based on an embedded code, as mentioned above. Such fingerprinting may be used by the content display system 100 to detect content segments including product placement content displays. In another alternative, the content display system 100 may use signals or text included in a closed caption or subtitle to detect and identify the content. In yet another alternative, product placement content displays may be preceded by a code to aid in their detection and identification, and the content display system 100 may use the code to detect an impending product placement content display. Other techniques for detection and identification of television content may be used with the content display system 100.

If the identified television content is from a promoter 70 running a companion online content segment campaign, the content display system 100 may "boost" or increase the price the promoter currently is willing to bid for a content segment display to increase the chances of the promoter's content segment being selected for placement at the Web sites 60. If, during the time the bid price is increased, the media device 24 requests a Web page from one of the Web sites 60, and the content display system 100 receives content segment display request from the Web site 60 being accessed by the media device 24, the content display system 100 may select one of the promoter's companion online content segments for placement at the Web page.

As an example of the above-described process, assume that television content airs for an automobile manufacturer, in this example, for Zephyr Motors, which makes light trucks, passenger cars, SUVs, and similar automobiles, and that the television content is being viewed by an individual at media device 22. The same individual may be operating the media device 24, browsing the Internet. The television content may be 30-seconds in length and include video showing one or more Zephyr products. Zephyr has established a companion online content segment campaign in cooperation with the content display network 100 (Zephyr is, in this example, a promoter 70). As is described below, the content display system 100 may use many centralized or distributed television monitors to monitor for and detect television content that is tied to the companion online content segment campaign. Thus, the content display system 100 detects and identifies the display of Zephyr television content. After detecting this display, the content display system 100 increases the bid amount that Zephyr will pay for a content segment display to better ensure that Zephyr's content segment will be displayed during, or near in time to the display of the Zephyr television content. For example, the content display system 100 may increase the bid amount per impression or per 1,000 impressions, by a factor of 5. Assuming this increase in the bid amount is sufficient to acquire a display location at a Web site (for example, at a Web site for a major newspaper) being accessed by the individual using the media device 24, and assuming further that the individual fits a category that is appropriate for the television-promoted Zephyr products, the content display system 100 serves an online content segment for a Zephyr automobile when the individual accesses the newspaper's Web site, or refreshes the Web page. As noted above, the promoter 70 may have more than one version of the companion online content segment, and which version is served, when the promoter 70 has the winning bid, may be based on matching content segment to information about individuals.

As described, the determination of which content segments should be placed at which Web pages depends in part on information related to the individual at the viewing location 20. This information may be provided by the individual voluntarily. For example, an individual may register with the publisher 40 or the ad display system 100 and may provide information such as a password and user ID. More specifically, the publisher 40 may operate a satellite television broadcast network, and the individual may subscribe to programming broadcast over the satellite television broadcast network. Upon sign up for this subscription, the individual may select a password and user name. The individual also may provide personally-identifiable information such as name and address. However, to protect the viewer's privacy, the information may be "anonymized" or "partially anonymized". Examples of partially anonymized information may include the IP address of a media device or a user name provided by the individual. Anonymized information is any information that sufficiently identifies the individual or media device without compromising the individual's privacy, such as a user pseudonym or other abstraction of the individual's actual identity. The anonymized information may include cookies, individual/device identifiers, or other information about the individual's identity. The publisher 40 then, with the consent of the individual, and perhaps for a reduced subscription fee, may make some of this information available for the purposes of scheduling content segments and monitoring content watched. The registration may be a one-time registration or a recurring process. Furthermore, the systems and methods disclosed herein may provide for the individual to opt in or opt out of a specific aspect of the display advertising process at any time. For example, the individual may opt out of a method that collects information about which content was watched. The media devices 22 and 24 may send, with the consent of the individual (e.g., via opt out, opt in, or anonymization), identification (ID) information to the publisher 40 that identifies the media devices 22 and 24 and/or the individual. One aspect of sending the information includes a media device signing on with a service of the publisher 40. In some cases, the media device may sign on automatically using previously provided and stored credentials or other automatic information. Any personally-identifiable information that may be provided by the individual, either directly or indirectly, may be made anonymous.

FIG. 2 illustrates a logical view of a television program with program breaks. In FIG. 2, television program 42 includes program segments 1-4 and program breaks 1-3 during which television content may be displayed. However, the exact display of content in a specific program break may not be known until the actual program break occurs. Associated with the content in the program breaks may be a companion online content segment. But to determine when and if a companion online content segment should be displayed, it first may be necessary to detect which content is displayed in which program break and then to dynamically adjust the companion online content segment campaign. Such detection, as noted above, may rely on passive mechanisms such as audio and/or video fingerprints. In an alternative, active mechanisms, such as watermarks, or signals embedded in a subtitle string may be used to identify currently displayed television content. The detection of the currently displayed television content then may be used to determine if the detected content has a corresponding companion online content segment, and to adjust the bid price for that companion content segment, if desired.

FIG. 3 illustrates an example content segment that may be positioned on a Web page 40. In FIG. 3, companion online content segment 90 is for a Spirit sports utility vehicle (SUV) manufactured by Zephyr USA. The segment 90 shows features that may be extracted by the content display system 100 from corresponding television content, or may be created by the content display system 100 based on terms provided by the promoter 70. The features include logo Z (91), product Spirit (92), manufacturer Zephyr (93), text blocks 94, dealer name 95, dealer URL 96, links 97, Zephyr URL 98, and product (Spirit SUV) image 99. The image 99 may be a still of a video display of the Spirit SUV as shown during display of the corresponding television content.

The companion online content segment 90 shown in FIG. 3 includes links 97 that allow an individual to further navigate the Zephyr USA Web site. Navigating the links 97 may take the individual to a Web page that offers features and incentives designed to entice the individual into buying the Spirit SUV. For example, a follow-on Web page may offer $100 to any individual that takes the Spirit SUV for a test drive in the next three days. Thus, the companion online content segment campaign represents a way to build brand awareness, engage and educate consumers, and market the promoter's products and services. An aspect of the companion online content segment campaign disclosed herein may allow promoters to generate social media activity as a further mechanism for building their brands, informing consumers, and marketing products and services. A promoter 70 may seek to interact with individuals viewing a television program through a social network by creating rules to post content segments on behalf of the promoter onto social networks when the promoter's television content airs. This posting could be promoter, social network, and television show specific. For example, assume that a promoter 70 (a fast food restaurant chain) will air television content about some of its food items during the season premier television show about a Madison Avenue advertising firm. When the television content airs, the content display system 100 may serve a content segment throughout a social network's user pages such as: "Just aired our first spot during Ad Men (link to publisher) and (link to social tag for show)—what did you think? $1 off for first 1,000 posts who know which favorite menu item is back and was featured in our Ad Men ad". Alternately, the content segment may be presented only on a home page of the social network, but may be replicated at user pages with consent of the users. The content display system 100 may serve the content segment as part of a contract with the social network. Alternately, the social network may have available a number of content segment slots, and the promoter 70 may bid for these slots, in competition with other promoters, in the same manner as disclosed herein for other Internet-based display promotionals.

Figure 4:
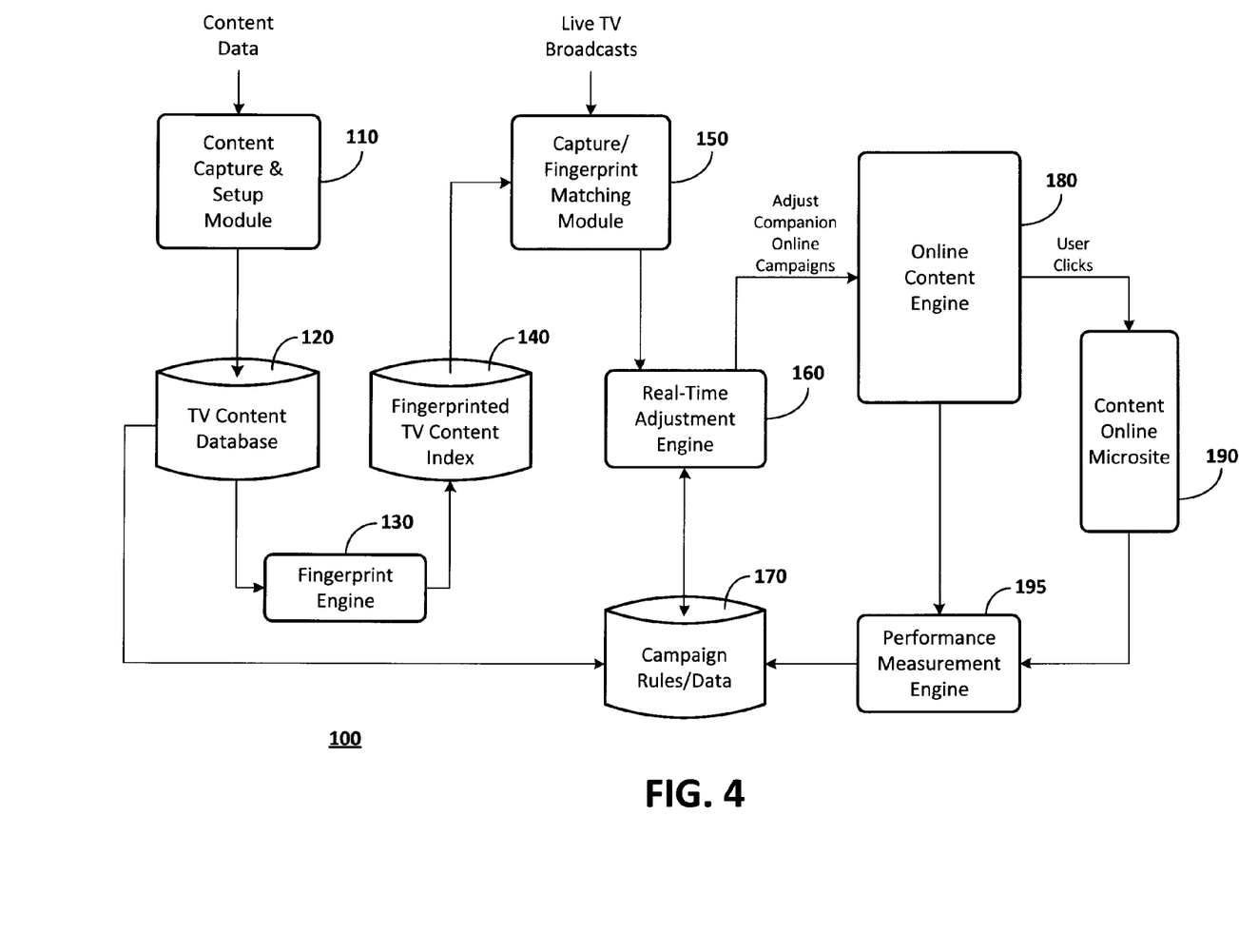
FIG. 4 illustrates an example content display system as used in the environment of FIG. 1.

FIG. 4 illustrates an example logical view of structures and functions of the content display system 100. The system 100 provides for television content capture, indexing, matching, and real-time online content segment campaign adjustments. In FIG. 4, content display system 100 includes content capture and setup module 110, television content database 120, fingerprint engine 130, fingerprinted television content index 140, content capture/fingerprint matching module 150, real-time adjustment engine 160, campaign rules/data database 170, online content segment engine 180, content online micro site 190, and performance measurement engine 195.

The content capture and setup module 110 receives content for processing. The content may be received by accessing existing databases of content. Alternatively, the content may be provided by the promoters 70 in advance of their airing. In another alternative, the received content may be stored in the database 120. The fingerprint engine 130 generates a fingerprint of each received content segment and provides the fingerprint and a corresponding index number for storage in the fingerprinted TV content index 140. The fingerprint may be audio, video, or both audio and video. With this data stored in the index 140, the system 100 is able to compare the fingerprints to data processed from live television broadcasts. The module 110 also includes a user interface (not shown) that allows a promoter 70 to interact with the content display system 100 to establish and configure companion online content segment campaigns, rules for boosting, including networks from which content is to be received that will trigger the companion online content segment boosting, the duration of the boost, and the dollar amount of the boost. The user interface provides this information for storage in the campaign rules/data database 170.

The capture/fingerprint matching module 150 receives the live television broadcasts, identifies content, extracts fingerprints of the content, and compares the extracted fingerprints to the fingerprints stored in the index 140. By matching the fingerprints, the module 150 is able to identify what content is playing at a specific time. Note that the module 150 makes the comparison in real-time; more specifically, the module 150 may complete the fingerprint process and identify content in a live television within a few seconds of the start of the live broadcast of the content. When the module 150 identifies a match, the module 150 notifies the real-time adjustment engine 160.

The real-time adjustment engine 160 adjusts an existing companion online content segment campaign in response to detection of a television content that may trigger a boost in the companion campaign. Thus, if television content that has a corresponding companion online content segment campaign is identified by the module 150, as signaled to the real-time adjustment engine 160, the engine 160 will boost the bid price for the corresponding companion online content segment by the amount established by the promoter 70 as recorded in the database 170, and for the duration specified. For example, the bid amount may be boosted for the duration of the identified television content, and for a time thereafter, such as 90 seconds, as determined by the promoter 70. The engine 160 provides the boosted price to the online content segment engine 180.

The online content segment engine 180 applies the increased bid price for content segments displays and selects individuals most likely to act on the content segment displays (e.g., click on the content segments). This selection may be based on the device type (e.g., smart phone, tablet, device with a specific operating system), geographic location of the device, and other criteria as established, in an embodiment, by the promoter 70. In an embodiment, the engine 180 may "build" an online content segment based on data extracted from the detected television content, and data submitted by the promoter 70 when establishing the companion online content segment campaign. For example, television content for a Zephyr SUV may include several frames of MPEG video showing the Zephyr SUV, along with the Zephyr logo, and various text blocks. The content display system 100 may extract certain of these features to form the companion online content segment 90 shown in FIG. 3. Alternately, the promoter 70 may provide the content segment creative when establishing the companion online content segment campaign.

The individual viewing the Web page having the companion online content segment may notice the content segment and click on the content segment, which is reported to the content online microsite 190. Clicking on the content segment may signify the individual is interested in the subject matter of the content segment, including any offers that may be provided in the content segment. To record the performance of the companion online content segment campaign, the performance measurement engine 195 may record clicks and click throughs, such as product purchases, service sign ups, coupon requests, and other recordable actions of the individual at the Web page, or a linked Web page. These performance metrics may be saved in the database 170.

Figure 5:
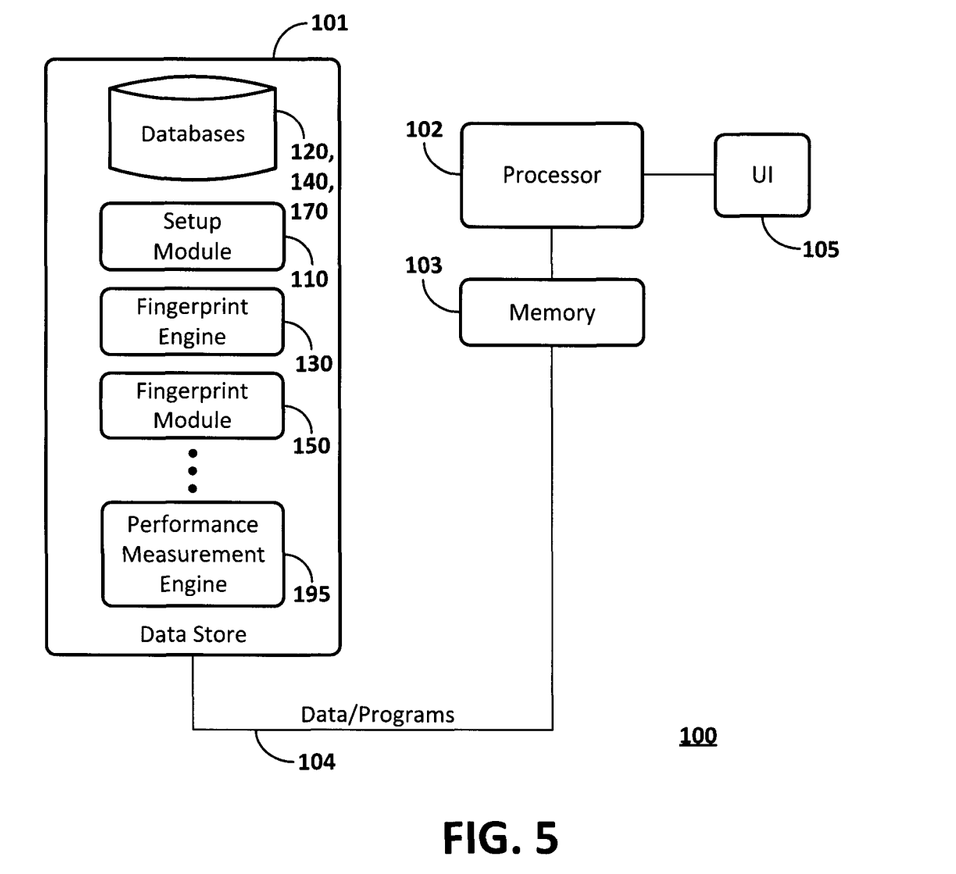
FIG. 5 illustrates an example of hardware and software components of the content display system of FIG. 4.

FIG. 5 illustrates components of content display system 100. In FIG. 5, system 100 includes data store 101 in which are stored the various databases shown in FIG. 4, including databases 120, 140, and 170. The data store 101 also stores the programming code used to execute the functions of the modules/engines 110, 130, 150, 160, 180, 190, and 195. Coupled to the data store 101 by way of communications bus 104 is processor 102 and memory 103. The processor 102 loads program code from the data store 101 into the memory 103 to execute machine instructions that operate the content display system 100. Finally, the system 100 includes user interface 105, which as noted above, allows a promoter 70 to interface with the system 100.

Figure 6:
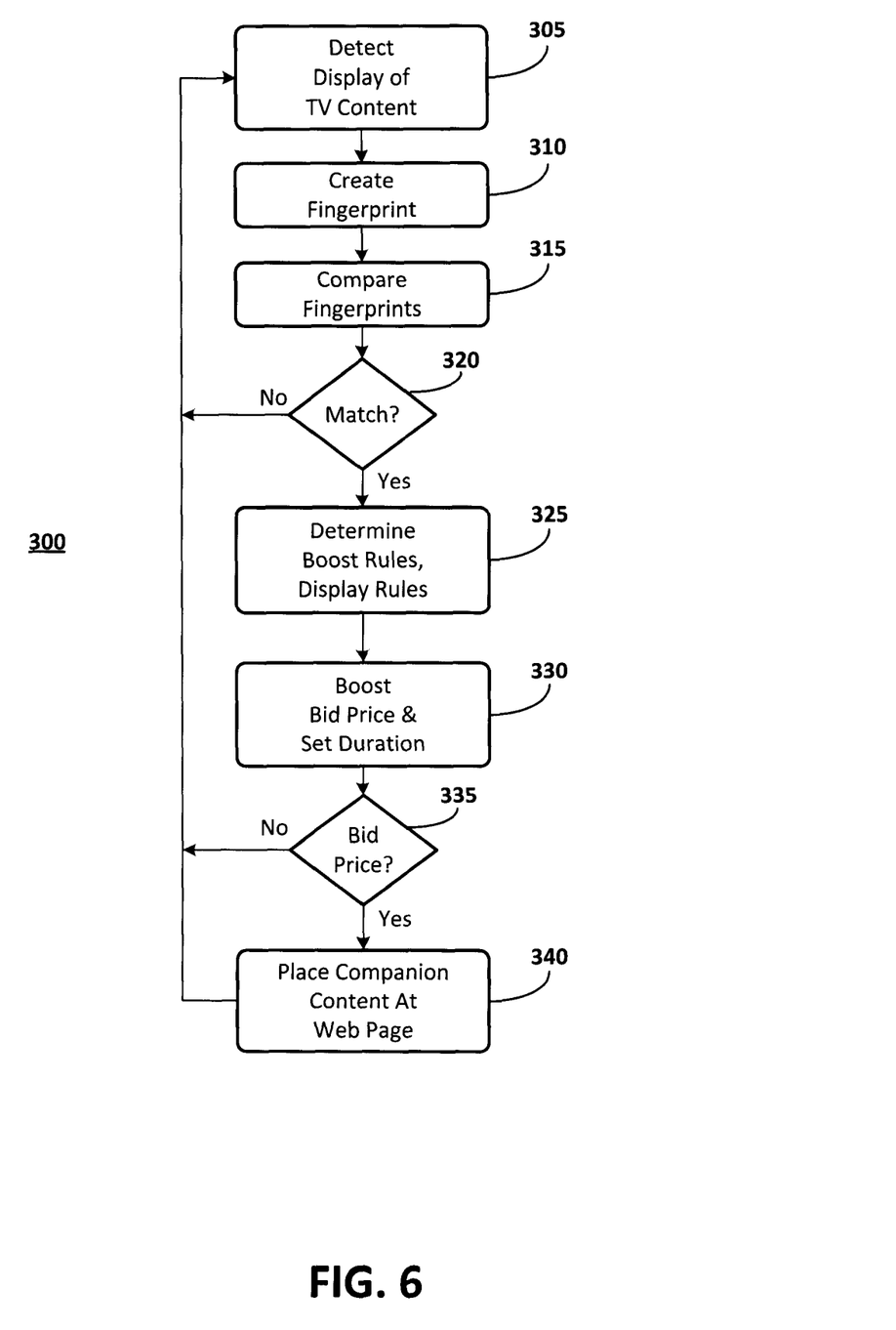
FIG. 6 illustrates and example processes for dynamic companion online promotional activity.

FIG. 6 illustrates an example operation of the content display system 100. In FIG. 6, method 300 begins in block 305 when the content display system 100 detects the display of content on live television. Note that the system 100 may include many thousands of television monitors that view current live television programming to detect the display of content. These many monitors make it possible to detect content for which a companion online content segment campaign exists and to match, in real time or near real time, content and content segments using minimal processing and transmission bandwidth. Detection of content may be based, for example, on an embedded code in the broadcast content stream that signals an impending program break. When content is detected, the system 100 creates a fingerprint of the detected content (the fingerprint may be audio, video, or both), block 310. As an alternative to detecting content based on an impending program break, the content display system 100 may create fingerprints continuously. In this alternative, the detection of content may occur when the content display system 100 detects that a match exists between a portion of the continuously created fingerprints and the fingerprints stored in a fingerprint database such as the index 140. In block 315, the system 100 compares the fingerprint of the detected content, or, alternately, the continuously-created fingerprints to the database (e.g., the index 140) of content fingerprints. In block 320, the system 100 determines if the fingerprints match. If the fingerprints do not match, the method 300 returns to block 305. However, if the fingerprints match, the method 300 moves to block 325. Matching fingerprints in block 320 may signify that the detected content has a corresponding companion online content segment, since, in an embodiment, only fingerprints for such detected content are stored in the index 140. In block 325, the system 100 consults the database 170 to determine the boost, selection criteria, and content segment display rules associated with the companion online content segment campaign. Next, in block 330, the engine 160 boosts the bid price for the online content segments and provides the boosted price, and other rules and other criteria to the online content segment engine 180.

In block 335, the engine 180 determines if the bid price for a specific slot in a specific Web page is sufficient. If the bid price is not sufficient, the method 300 returns to block 305. However, if the bid price is sufficient, the method 300 moves to block 340 and the engine 180 places the content segment at the Web page. The method 300 then returns to block 305. Thus, the method 300 continuously executes.

Certain of the devices shown in FIGS. 1 and 2 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a flow chart and accompanying description to illustrate the embodiments represented in FIG. 6. The disclosed devices, components, and systems contemplate using or implementing any suitable technique for performing the steps illustrated. Thus, FIG. 6 is for illustration purposes only and the described or similar steps may be performed at any appropriate time, including concurrently, individually, or in combination. In addition, many of the steps in the flow chart may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

I claim:
1. A method comprising:
   determining, by a processor, that television content for a live television broadcast is currently being viewed at a first media device by a user;
   creating, by the processor, a fingerprint of the television content;
   determining, by the processor, from the fingerprint that the television content has a plurality of companion online content segments being related to the television content;

determining that the user is accessing online media provided by one or more Internet-based content providers at a second media device while the user is viewing the television content at the first media device;

determining an increase for a bid price to display one of the plurality of companion online content segments in the online media being accessed by the user at the second media device;

determining a duration of time for which the increase of the bid price is to be applied, the duration of time for the increase of the bid price being associated with a duration of airing the television content and a duration following the airing of the television content at the first media device;

increasing the bid price of the companion online content segment over the duration of time for the increase of the bid price;

determining that the increasing of the bid price is sufficient to supply one of the plurality of companion online content segments for display in the online media being accessed by the user at the second media device; and supplying one of the plurality of companion online content segments for display in the online media being accessed by the user at the second media device while the user is viewing the television content on the first media device.

2. The method of claim 1, wherein the duration following the airing of the television content is a duration immediately following the airing of the television content.

3. The method of claim 1, further comprising:
limiting locations to display the one of the plurality of companion online content segments.

4. The method of claim 3, wherein the locations are Web pages, and wherein the Web pages are limited based on a type of device accessing the Web pages.

5. The method of claim 4, wherein the Web pages are limited based on content of the Web pages.

6. The method of claim 1, further comprising:
selecting the one of the plurality of companion online content segments for display in the online media at the second media device based on a category associated with the user.

7. The method of claim 1, further comprising:
acquiring existing television content from a data store of television content;
creating fingerprints from the acquired existing television content; and
storing the created fingerprints corresponding to the existing television content in a fingerprinted television content index.

8. A system comprising:
a memory; and
a processor coupled to the memory to:
determine that television content for a live television broadcast is currently being viewed at a first media device by a user;
create a fingerprint of the television content;
determine from the fingerprint that the television content has a plurality of companion online content segments being related to the television content;
determine that the user is accessing online media provided by one or more Internet-based content providers at a second media device while the user is viewing the television content at the first media device;

determine an increase for a bid price to display one of the plurality of companion online content segments in online being accessed by the user at the second media device;

determine a duration of time for which the increase of the bid price is to be applied, the duration of time for the increase of the bid price being associated with a duration of airing the television content and a duration following the airing of the television content at the first media device;

increase the bid price of the companion online content segment over the duration of time for the increase of the bid price;

determine that the increasing of the bid price is sufficient to supply one of the plurality of companion online content segments for display in the online media being accessed by the user at the second media device; and provide one of the plurality of companion online content segments for display in the online media being accessed by the user at the second media device while the user is viewing the television content on the first media device.

9. The system of claim 8, wherein the duration following the airing of the television content is a duration immediately following the airing of the television content.

10. The system of claim 8, wherein the processor is further to:
limit display of the one of the plurality of companion online content segments to Web pages, and wherein the Web pages are limited based on a type of device accessing the Web pages.

11. The system of claim 8, wherein the processor is further to:
select the one of the plurality of companion online content segments for display in the online media at the second media device based on a category associated with the user.

12. The system of claim 8, wherein the processor is further to:
limit locations to display the companion online content segment based on content of Web pages.

13. A non-transitory computer readable storage medium encoded with a computer program, the program comprising instructions that, when executed by a processor, causes the processor to:
receive determine that television content for a live television broadcast is currently being viewed at a first media device by a user;
create a fingerprint of the television content;
determine from the fingerprint that the television content has a plurality of companion online content segments being related to the television content;
determine that the user is accessing online media provided by one or more Internet-based content providers at a second media device while the user is viewing the television content at the first media device;
determine an increase for a bid price to display one of the plurality of companion online content segments in online media being accessed by the user at the second media device;
determine a duration of time for which the increase of the bid price is to be applied, the duration of time for the increase of the bid price being associated with a duration of airing the television content and a duration following the airing of the television content at the first media device;

increase the bid price of the companion online content segment over the duration of time for the increase of the bid price;

determine that the increasing of the bid price is sufficient to supply one of the plurality of companion online content segments for display in the online media being accessed by the user at the second media device; and supply one of the plurality of companion online content segments for display in the online media being accessed by the user at the second media device while the user is viewing the television content on the first media device.

14. The non-transitory computer readable storage medium of claim 13, wherein the processor further operates to receive click through activity related to the one of the plurality of companion online content segments.

15. The non-transitory computer readable storage medium of claim 13, wherein the processor creates an audio fingerprint of the received television content.

16. The non-transitory computer readable storage medium of claim 13, wherein the processor determines an identity of the received television content by detecting a code embedded in a subtitle string provided with the received television content segment.

17. A method comprising:

determining, by a processor, that television content for a live television broadcast is currently being viewed at a first media device by a user;

determining, by the processor, that the television content has a plurality of companion content segments being related to the television content;

determining that the user is accessing online media provided by one or more Internet-based content providers at a second media device while the user is viewing the television content at the first media device;

selecting in substantially real time, by the processor, one of the plurality of companion content segments based on geographic location of the second media device;

determining an increase for a bid price to display the selected companion content segment in the online media being accessed by the user at the second media device;

determining a duration of time for which the increase of the bid price is to be applied, the duration of time for the increase of the bid price being associated with a duration of the broadcast of the television content and a duration following the broadcast of the television content at the first media device;

increasing the bid price for the selected companion content segment over the duration of time for the increase of the bid price;

determining that the increasing of the bid price is sufficient to supply the selected companion online content segment for display in the online media being accessed by the user at the second media device; and serving the selected companion content segment for display in the media device being accessed by the user at the second media device in conjunction with the broadcast of the television content at the first media device.

18. The method of claim 17, wherein the first media device is a television and the second media device is a mobile device.

19. The method of claim 18, further comprising serving the selected companion content segment through an Internet Web site at the mobile device.

20. The method of claim 19, wherein the Web site is a social media Web site.

21. The method of claim 18, further comprising serving the selected companion content segment through an application executing on the mobile device.

22. The method of claim 18, further comprising identifying the mobile device, and wherein the selected companion content segment is selected based on an identity of the mobile device.

23. The method of claim 17, further comprising selecting the one of the plurality of companion content segments based on information related to the user.

24. The method of claim 17, further comprising:

identifying a television program hosting the television content; and selecting the one of the plurality of companion content segments based on the identity of the television program.

25. The method of claim 17, wherein the television content is aired on a television and the selected companion content segment is served on the television.

* * * * *